United States Patent

[11] 3,616,858

| [72] | Inventor | Syed H. Raza |
| | | Tulsa, Okla. |
| [21] | Appl. No. | 28,943 |
| [22] | Filed | Apr. 14, 1970 |
| [45] | Patented | Nov. 2, 1971 |
| [73] | Assignee | Pan American Petroleum Corporation |
| | | Tulsa, Okla. |

[54] METHOD FOR PLUGGING GAS ZONES WITH SILICONE FOAMS
8 Claims, No Drawings

[52] U.S. Cl. .................................................. 166/305 R, 166/274, 166/294
[51] Int. Cl. ...................................................... E21b 33/138
[50] Field of Search .......................................... 166/294, 285, 274, 309, 305 R, 306, 310, 314; 252/8.55 D; 260/825

[56] References Cited
UNITED STATES PATENTS

| 2,814,601 | 11/1957 | Currie et al. ................... | 260/825 |
| 2,857,356 | 10/1958 | Goodwin, Jr. ................... | 260/825 |
| 3,120,266 | 2/1964 | Martin et al. ................... | 166/309 |
| 3,207,218 | 9/1965 | Holbrook et al. ............... | 166/305 R |
| 3,306,354 | 2/1967 | O'Brien .......................... | 166/294 X |
| 3,330,351 | 7/1967 | Bernard .......................... | 166/305 R |
| 3,342,261 | 9/1967 | Bond ............................... | 166/305 R X |
| 3,368,624 | 2/1968 | Heuer, Jr. et al. ............. | 166/305 R |
| 3,464,491 | 9/1969 | Froning .......................... | 166/294 X |
| 3,530,940 | 9/1970 | Dauben .......................... | 166/305 R |
| 3,547,199 | 12/1970 | Froning et al. ................. | 166/305 R |

*Primary Examiner*—Stephen J. Novosad
*Attorneys*—Paul F. Hawley and Buell B. Hamilton

ABSTRACT: A special type of silicone is used as a foaming agent for plugging gas zones of oil-bearing formations. The agent is oil-soluble. It forms stable foams with light and heavy oils. It does not form stable emulsions between oil and water. The silicone is of the MQ type.

METHOD FOR PLUGGING GAS ZONES WITH SILICONE FOAMS

Many underground oil-bearing formations also contain gas. Due to differences in density, the gas is in the upper part of the formation above the oil. Frequently, casing is cemented through the formation and is perforated only opposite the oil zone in an effort to avoid producing gas from the gas zone. Usually, however, there is a considerable amount of vertical permeability, so when the well pressure is dropped to cause oil to flow to the well, the gas expands down into the oil zone and is also produced into the well. The gas fills a cone-shaped volume of the oil zone around the well and thus reduces flow of oil to the well.

It has previously been proposed to use foams to reduce entry of gas into an oil-producing well. In U.S. Pat. No. 3,207,218 Holbrook et al., for example, it is suggested that either oil-soluble or water-soluble foaming agents be injected into oil-bearing formations. When gas attempts to flow through a formation treated with a foaming agent solution, a foam forms blocking further flow of gas. In the portions of the formation where no foam forms, the injected foaming agent solution is expected to simply flow back out of the formation into the well.

Solutions to two problems would greatly improve this process. One problem is the sensitivity of oil foams to the presence of water and the sensitivity of water foams to the presence of oil. If a water solution of a water-soluble foaming agent is used, the resulting foam is a water-gas foam. The oil which is present in the formation quickly breaks such foams, so the blocking action does not last as long as desired. Even if an oil solution of an oil-soluble foaming agent is used, the foam breaks more quickly than desired due to the presence of the water naturally present in most oil-bearing formations.

The other problem is the formation of emulsions between the oil and water. Most of the better foaming agents are also very good emulsifying agents. For example, if a water solution of a water-soluble foaming agent is injected into an oil-bearing formation and if this foaming agent is also a good emulsifying agent, an emulsion can form in the oil-bearing formation, this emulsion blocking flow of oil as well as gas to the producing well. Thus, the well may produce nothing at all after treatment. Even when an oil-soluble agent is used in an oil solution, there is frequently enough water present in the formation to form an emulsion which may seriously decrease the flow of oil to the well.

Another effect of emulsion formation is a decrease in foam formation. The quantity of surface-active agent which concentrates at oil-water interfaces in an emulsion is not available for concentrating at oil-gas or water-gas interfaces to form foams. A possible explanation for the effects of water on oil foams and the effects of oil on water foams is that the oil-water interface takes surface-active agent from the liquid gas interfaces, thus reducing the strength and life of the foam.

An object of this invention is to provide an improved method for plugging gas zones of oil-bearing formations with foams. A more specific object is to provide such a method employing a foaming agent with less tendency to form emulsions. Another more specific is to provide a method employing an agent which forms an oil foam less affected by water. Still other objects will be apparent from the following description and claims.

I have found that certain surface-active agents which provide a reduction in surface tension (interfacial tension between liquid and gas) and only a small reduction in interfacial tension between water and oil provide long-lasting strong foams for plugging flow of gas in oil-bearing formations while producing few emulsion problems. Very few such agents exist. A particularly desirable type of agent is an oil-soluble silicone of the MQ type. Oil solutions of this agent can be injected into oil-bearing earth formations with much greater confidence in the strength and durability of the foams which form when gas attempts to flow through the solution. These solutions can also be used with little danger of emulsion formation.

The effects of various surface-active agents are reported in table I.

TABLE 1

| No. | Surface Active Agent— Composition | Surface Tension% Dynes/cm. | Interfacial Tension%% Dynes/cm. | Foaming Ability Light Oil | Foaming Ability Heavy Oil | Effect of Water |
|---|---|---|---|---|---|---|
| 1 | None | 28.0 | 47.9 | | | |
| 1 | Fluorocarbon | 26.1 | 27.5 | NF | NF | LE |
| 2 | Fluorocarbon | 25.5 | <0.1 | SF | NSF | E |
| 3 | Fluorocarbon | 25.7 | <0.1 | SF | NSF | E |
| 4 | Fluorocarbon | 25.6 | <0.1 | SF | NSF | E |
| 5 | Ethoxylated Alkyl Phenol | 25.2 | <0.1 | NF | NF | E |
| 6 | Silicone Polyoxy Alkylene Copolymers. | 25.8 | 2.5 | SF | NF | E |
| 4 | ......do | 25.5 | <0.1 | NF | NF | E |
| 8 | ......do | 24.7 | 1.3 | NF | NF | E |
| 9 | ......do | 26.7 | 5.8 | SF | NF | E |
| 10 | ......do | 25.2 | 8.2 | NF | NF | E |
| 11 | ......do | 25.8 | 1.2 | NF | NF | E |
| 12 | ......do | 24.4 | 9.8 | NF | SF | E |
| 13 | MQ Silicone | 26.1 | 29.2 | SF | SF | NE |
| 14 | ......do | 26.5 | 20.7 | SF | SF | NE |
| 15 | Siloxane | 26.0 | 17.4 | SF | NSF | LE |
| 16 | ......do | 25.1 | 3.8 | NSF | NF | E |
| 17 | Silicone Polyoxy Alkylene Copolymer. | 26.2 | 2.1 | NSF | NSF | E |
| 18 | ......do | 25.8 | 9.2 | NF | NSF | E |
| 19 | ......do | 26.2 | 8.5 | SF | NSF | LE |
| 20 | ......do | 26.7 | 0.7 | SF | NSF | LE |
| 21 | MQ Silicone | 24.8 | 40.6 | SF | NSF | NE |
| 22 | Tridecyl Exter of Sodium Sulfosuccinate. | 25.1 | 7.0 | NF | NF | E |

% At 75°±5° F.
%% Between light oil and ¼ N NaCl brine.
SF—Stable Foam; NF—No Foam; NSF—Non-Stable Foam; E—Emulsion; NE—No Emulsion; LE—Little Emulsion.

In the tests reported in table I, the light oil was a petroleum fraction boiling in the range from about 390° to about 490° F. It was treated with sulfuric acid and then neutralized with sodium hydroxide solution to remove impurities. The heavy oil was a high-boiling mineral oil having a viscosity of about 10 cps. It was acid-treated to remove impurities. In the surface tension, interfacial tension, and emulsifying tests, 1 percent by volume of the surface-active agent was added to the light oil.

In the foaming tests, 1 percent solutions in both light and heavy oils were checked. In the surface tension and interfacial tension tests, a ring Tensiometer was used. In the foaming test, 10 ml. of the 1 percent solution were placed in a test tube and rate was measured until the rate stabilized. The stabilized gas flow rate is also reported in table II for comparison.

The agent numbers in table II are the same as in table I. Surface tensions and interfacial tensions of 1 percent solutions

TABLE II

| Foaming Agent | | Surface Tension Dynes/cm. | Interfacial Tension Dynes/cm. | Gas Breakthrough Time, Min. | Stabilized Gas Rate ml./Min. |
|---|---|---|---|---|---|
| No. | Composition | | | | |
| | None | 28.0 | 47.9 | 3 | 250 |
| 7 | Silicone Polyoxy Alkylene Copolymer | 25.5 | <0.1 | 3 | 230 |
| 13 | MQ Silicone | 26.1 | 29.2 | 9 | 14 |
| 14 | do | 26.5 | 20.7 | 40 | 17 |
| 20 | Silicone Polyoxy Alkylene Copolymer | 26.7 | 0.7 | 3 | 250 | were shaken for 10 seconds. If no foam formed, the table indicates NF. If a foam formed but collapsed upon standing for 5 minutes to less than about 75 percent of its original height, the table indicates NSF, since the solution did foam but the foam was not very stable. If the foam remained above the 75 percent level for 5 minutes, the table indicates SF. In the emulsion tests, 5 ml. of the light oil solution and 5 ml. of ¼-normal sodium chloride brine were shaken together for 10 seconds and observed. If the oil and water separated immediately, the table shows NE. If some separation of water, oil, or both, took place, but some emulsion also remained immediately after shaking, the table shows LE. If only an emulsion remained immediately after shaking, the table shows E.

The most significant point to be noted in table I is that only three of the surface-active agents did not cause an emulsion between the oil and water. Five others caused only a little emulsion formation. All others caused rather stable emulsions which would certainly give difficulties in many low-permeability oil-bearing formations which also contain water. Another rather surprising observation is that although none of the oil-soluble agents reduced the surface tension of the oil very much, several of them caused the oil to form rather stable foams with the light oil. Only three caused stable foams with heavy oil but many formed foams which were not very stable.

In the MQ type silicones, the terms M and Q have the usual significance in silicone naming as described, for example, in *Encyclopedia of Chemical Technology*, by Kirk and Othmer, 2nd Ed., Pages 222 and 223. In this naming system, an M unit is one having the formula $R_3SiO_{.5}$, and a Q unit has the formula $SiO_2$. The R groups are alkyl or aryl radicals. For my purposes, they are methyl, ethyl, propyl, vinyl, or phenyl radicals, at least 90 percent of the total R radicals being aliphatic. The MQ silicones useful for my purposes are benzene-soluble resin copolymers of the two units in which the ratio of $R_3SiO_{.5}$ units to $SiO_2$ units is from about 0.6 to 1 to about 0.9 to 1. These MQ silicones are commonly used as intermediates in the preparation of adhesives. The preparation of the resin copolymers is described, for example, in U.S. Pat. Nos. 2,814,601 Currie et al., and 2,857,356 Goodwin. The preferred material is agent No. 13 in table I. This material is a benzene-soluble MQ silicone resin in which all R radicals are methyl groups. It is a solution containing 60 percent by weight of the resin in xylene solvent. Agent 21 in table I is also a xylene solution, while agent 14 is a 50 percent solution of a similar MQ resin in a plasticizer.

Flow tests were run in sand-packed tubes 1½ inch in diameter and 18 inches long to determine how flow characteristics correlated with the data in table I. In these tests, the tubes were first packed with No. 16 Ottawa sand. The resulting sand packs had very high permeabilities of about 3,000 millidarcys. The packs were first saturated with ¼-normal sodium chloride brine. Light oil was then injected until no more brine was produced. A ¼-pore volume slug of light oil, containing 2 percent by volume of the agent to be tested, was then injected and followed by the injection of constant-pressure gas at a pressure gradient of 2 p.s.i. per foot. The time until gas broke through was recorded and is reported in table II. The gas flow are repeated for convenience.

Agent 7 did not produce a foam in the shaking test, so no foam-plugging was expected. Agent 7 did form a stable emulsion in the shaking test. The interfacial tension between oil and water in the presence of agent 7 indicates the agent was strongly concentrated at the oil-water interface. Nevertheless, it will be noted in table II that the emulsion was not sufficient to plug the very high permeability of the sand pack. The time for gas breakthrough was just as short and the stabilized gas flow rate was almost as high as when no agent was used.

Agent 20 did not seem to concentrate so strongly at the interface as agent 7, as indicated by the higher interfacial tension. The result was that only a little emulsion and a stable foam with light oil was formed with agent 20 in the shaking tests. The flow test reported in table II shows that neither the emulsion nor the foam was strong enough to plug the sand pack.

Agents 13 and 14 concentrated very little at the oil-water interface, as indicated by the high interfacial tensions. Neither formed a stable emulsion in shaking tests. Both did form stable foams with light and heavy oil. Table II shows that both formed foams in the flow tests which were able to plug even the very high permeabilities of the sand packs.

The foaming agent solution is preferably a solution of about 0.5 to 3 percent by volume of the foaming agent in a light oil, such as kerosene, aromatic naphtha, diesel oil, or the like. Other oils, such as the crude oil produced from the formation to be treated, may also be used as the solvent. The concentration of foaming agent should not be much less than about 0.1 percent by volume if a stable foam is to be formed. The concentration should not ordinarily be much more than about 10 percent both for economic reasons and to avoid changes in the nature of the foam which sometimes occur at higher concentrations.

In treating an oil-producing well subject to gas coning, an oil solution of the foaming agent can simply be pumped down the well and into the entire oil-producing formation. The oil solution reestablishes oil saturation in the gas cone. The portion of the solution which enters the oil one readily flows back out when the well is returned to production. No water is introduced with the foaming agent to form an emulsion with crude oil naturally present. The foaming agent does not cause emulsions to form, so there is no emulsion between the injected oil solution and any water which is naturally present in the formation. When gas tries to flow through the portion of foaming agent solution in the gas one, foam forms which blocks further flow of gas at least for some time.

It is also possible to place a disk-shaped volume of foam, sometimes called a pancake, in the formation, the plane of the pancake being horizontal. In this case, a short section of the well is isolated at the desired level of the disk or pancake. Packers are preferably used to isolate this portion of the well. The foaming agent solution is then injected into the formation between the packers. The solution is followed by gas to form the foam disk. Oil may be injected below the bottom packer, above the top packer, or both, while the foaming agent solution and gas are injected between the packers to prevent excessive amounts of the solution or gas from entering the formation above or below the desired pancake. After the plugging operation, the well is produced through perforations below the pancake. The plugging disk can be placed anywhere between the original gas-oil contact and the perforations through which the well is produced after the plugging process. Gas may be injected above as well as into the zone to be plugged. When this is done, vertical flow is blocked by further formation of foam when the injected gas above the pancake tries to flow through the pancake.

In a preferred process, a packer is set in a well at or below the level of the original gas-oil contact in the formation. Then, the foaming agent solution is injected only into the formation above the packer. Oil may be injected into the formation below the packer to prevent excessive entry of the solution into the oil-bearing zone. The well may then be returned to production, depending on the backflow of gas to create a foam plug. Preferably, however, gas is injected from the well into the zone above the packer following the foaming agent solution to form at least some foam and to decrease the flow of the foaming agent solution back into the well when the well is returned to production. Oil may be injected into the zone below the packer during the gas-injection operation also, if desired. The flow of gas forms a plug in, and preferably somewhat below, the gas-bearing zone of the formation surrounding the well.

Since my class of foaming agents is so effective, it is difficult to inject enough gas into the formation from a well to form a foam extending very many feet radially outward from the well. Therefore, it is usually desirable to inject a small batch of oil free from foaming agent after the foaming agent solution and before the gas. The small batch of oil prevents mixing of the foaming agent solution and the gas until the gas has moved several feet out into the formation away from the well. It is also possible to inject the foaming agent solution, displace it away from the well with oil, and then simply return the well to production. This permits gas in the formation to backflow and produce a foam at a considerable distance from the well.

The volume of foaming agent solution to be used is about one-fourth the desired volume of foam. Thus, the pore volume to be filled with foam can be calculated for any process and then this figure can be divided by four to determine the volume of foaming agent solution to be injected. Enough foam to fill a volume extending to a distance of about 30 feet from the well is preferred. This distance would depend upon the location of the pancake. The closer it is to perforations, the smaller the size required. The gas may be air, nitrogen, engine exhaust gas, furnace flue gas, or the like, but preferably is natural gas which is substantially entirely methane. While my foaming agents are intended principally for use in combatting gas-coning problems, they can also be used in water-coning situations. The only difference in procedure from those described above is that backflow of gas cannot be relied upon to create the foam. When water ones are plugged, gas must always be injected from the well to create the foam.

Foams using my foaming agents may also be used in gas-drive operations to plug high-permeability zones. In this process, process, the high-permeability zone is preferably isolated, after which the foaming agent solution is injected and followed by gas. Preferably, enough solution is injected in this case to fill the high-permeability zone to a distance of as much as 100 feet or even more from the well. If this is done, gas cannot enter the filled portion of this zone, because whenever gas tries to enter the zone, foam forms to block further flow. The process can be applied to either producing wells or injection wells in a gas-drive operation.

My invention will be better understood from the following example. A well is 5,400 feet deep. It is cased to the bottom. An oil-bearing formation is penetrated from 5,300 feet to 5,360 feet. Originally, the bottom 50 feet of the oil-bearing formation were oil-filled while a gas cap existed in the top 10 feet. The casing is perforated from 5,340 feet to 5,350 feet. After producing for some time, the gas-to-oil ratio has become undesirably high.

In the remedial process, the casing is first perforated from 5,305 feet to 5,315 feet. A packer is run on tubing and is set at 5,320 feet. A solution of a foaming agent of the MQ-type silicone is then injected through the space between the tubing and casing and into the formation above the packer. The foaming agent solution is a 1.2 percent by volume solution of the active resin of agent 13 of table I (2 percent by volume of agent 13 itself). The agent is dissolved in an aromatic naphtha boiling in the kerosene range. Crude oil from the formation to be treated is injected through the tubing and into the formation below the packer, while the foaming agent solution is being injected above the packer. Injection below the packer is at about twice as great as the rate of injection above the packer. About 7,000 U.S. gallons of foaming agent solution are injected. This is followed by approximately 15,000 gallons of crude oil free from foaming agent. Crude oil is also injected below the packer while the resin-free oil is injected above the packer. Injection of crude oil below the packer is continued at about the same rate, while natural gas is injected above the packer. The volume of gas is about 10,000 cubic feet at reservoir pressure of about 1,400 pounds per square inch, or about a million cubic feet at standard conditions. The well is then returned to production through the lower perforations with a greatly decreased gas-to-oil ratio over an extended period of time.

Several materials and processes are described above by way of example. Many alternates and variations will occur to those skilled in the art. Therefore, I do not wish to be limited to the examples given, but only by the following claims.

I claim:

1. A method for reducing the flow of gas to an oil-producing well from a gas cap in the top of the oil-bearing formation comprising injecting into said formation an oil solution containing at least about 0.1 percent by volume of a benzene-soluble resin copolymer of $SiO_2$ units and $R_3SiO_{.5}$ units where R is selected from the group consisting of methyl, ethyl, propyl, vinyl, and phenyl radicals, at least 90 percent of the total R radicals being aliphatic, and in which copolymer the ratio of $R_3SiO_{.5}$ units to $SiO_2$ units is from 0.6:1 to 0.9:1, inclusive, and then returning the well to oil-producing operations.

2. The method of claim 1 in which said resin copolymer is of $SiO_2$ units and $(CH_3)_3 SiO_{.5}$ units.

3. The method of claim 1 in which the concentration of said resin copolymer is between about 0.5 and about 3.0 percent by volume of the solution.

4. The method of claim 1 in which gas is injected into said formation following the resin copolymer solution.

5. The method of claim 1 in which the resin copolymer solution is injected into the upper portion of the formation at the same time resin-free oil is injected into the lower portion of said formation.

6. The method of claim 5 in which gas is injected into the upper portion of said formation following said resin copolymer solution at the same time resin-free oil is injected into the lower portion of said formation.

7. The method of claim 6 in which a batch of resin-free oil is injected into the upper portion of said formation between said resin copolymer solution and said gas at the same time resin-free oil is injected into the lower portion of said formation.

8. The method of reducing the flow of gas to an oil-producing well from a gas cap in the top of the oil-bearing formation comprising injecting into the upper portion of said formation an oil solution containing at least about 0.1 percent by volume of a benzene-soluble resin copolymer of $SiO_2$ units and $(CH_3)_3 SiO_{.5}$ units, the ratio of $(CH_3)_3 SiO_{.5}$ units to $SiO_2$ units being from 0.6:1 to 0.9:1, inclusive, injecting a batch of resin-free oil into the upper portion of said formation following said resin copolymer solution to displace said resin solution away from said well, injection gas into the upper portion of said formation following said resin-free oil to form foam in said formation with said resin copolymer solution, injecting additional resin-free oil into the lower portion of said formation simultaneously with the injection of said resin copolymer solution, said batch of resin-free oil, and said gas into the upper portion of said formation, and returning the well to oil-producing operations.

* * * * *